(12) United States Patent
Awamura et al.

(10) Patent No.: US 7,561,328 B2
(45) Date of Patent: Jul. 14, 2009

(54) COLOR LASER MICROSCOPE WITH MICROMIRROR DEVICE FOR GENERATING AN INCOHERENT RECTILINEAR LIGHT BEAM

(75) Inventors: Daikichi Awamura, Kanagawa (JP); Yasunori Hada, Kanagawa (JP)

(73) Assignee: Ohkura Industry Co., Ltd., Kanagawa (JP)

(*) Notice: Subject to any disclaimer, the term of this patent is extended or adjusted under 35 U.S.C. 154(b) by 896 days.

(21) Appl. No.: 11/231,368

(22) Filed: Sep. 20, 2005

(65) Prior Publication Data
US 2006/0120250 A1 Jun. 8, 2006

(30) Foreign Application Priority Data
Dec. 8, 2004 (JP) .............................. 2004-355098

(51) Int. Cl.
G02B 21/06 (2006.01)
(52) U.S. Cl. ..................................................... 359/385
(58) Field of Classification Search ................. 359/368, 359/385, 388, 389
See application file for complete search history.

(56) References Cited

U.S. PATENT DOCUMENTS

| | | | | |
|---|---|---|---|---|
| 5,081,349 | A * | 1/1992 | Iwasaki | 250/234 |
| 6,195,202 | B1 * | 2/2001 | Kusunose | 359/368 |
| 7,359,117 | B2 * | 4/2008 | Shimizu et al. | 359/388 |
| 2003/0071204 | A1 * | 4/2003 | Sandstrom et al. | 250/237 G |
| 2004/0113059 | A1 * | 6/2004 | Kawano et al. | 250/234 |
| 2005/0036197 | A1 * | 2/2005 | Awamura | 359/385 |
| 2008/0298424 | A1 * | 12/2008 | Khan et al. | 372/107 |

FOREIGN PATENT DOCUMENTS

| | | | |
|---|---|---|---|
| EP | 548699 A1 * | 6/1993 | |
| JP | 2007171817 A * | 7/2007 | |
| JP | 2008040092 A * | 2/2008 | |

* cited by examiner

*Primary Examiner*—Alessandro Amari
*Assistant Examiner*—Mark Consilvio
(74) *Attorney, Agent, or Firm*—Carrier, Blackman & Associates, P.C.; Joseph P. Carrier; William D. Blackman

(57) ABSTRACT

A laser microscope or a color laser microscope in which a high-resolution image of a sample can be taken without using an acoustic optical element. A rectilinear light beam generating device is used for converting a laser beam into an incoherent rectilinear light beam diverging in a certain direction. Specifically, a laser beam emitted from laser source(s) is converted into an incoherent rectilinear light beam diverging in a certain direction by the rectilinear light beam generating device, and the rectilinear light beam is projected on a sample via a beam deflecting device so as to scan a surface of the sample. The beam reflected from the sample is received by a linear image sensor etc. so as to generate a video signal. As the rectilinear light beam generating device, a micromirror device in which micromirror elements are arranged in a two-dimensional array shape is used. The incident laser beam is converted into a light beam oscillating at a high speed in a certain direction by oscillation of each micromirror element so as to generate a diverging light beam.

20 Claims, 4 Drawing Sheets

COLOR LASER MICROSCOPE WITH MICROMIRROR DEVICE FOR GENERATING AN INCOHERENT RECTILINEAR LIGHT BEAM

BACKGROUND OF THE INVENTION

1. Field of the Invention

The present invention relates to a laser microscope and a color laser microscope which uses a rectilinear light beam generating device for converting laser light into an incoherent rectilinear light beam.

2. Description of the Background Art

There has been used a laser microscope in which a surface of a sample to be observed is two-dimensionally scanned by a laser beam, and light reflected from the sample is received by a linear image sensor. In this laser microscope, a laser beam emitted from a laser source is deflected at a high speed in a main-scanning direction by an acoustic optical element and also deflected in a sub-scanning direction by a galvanomirror so as to two-dimensionally scan a surface of a sample. Since this laser microscope achieves high resolution by using a confocal optical system, it has been used widely for the use which requires a high-resolution image. Also, since a surface of a sample is two-dimensionally scanned by a laser beam in this laser microscope, there is an advantage that the quality of the image is not deteriorated even in a case where there is a speckle pattern in a laser beam.

The above-mentioned laser microscope which scans a surface of a sample with a laser beam has an advantage that it is possible to take a high-resolution image. However, it has a drawback of a high manufacturing cost because an acoustic optical element for deflecting a laser beam at a high speed in a main-scanning direction is expensive. Also, it has another drawback that it requires a large-scale structure because the sway angle of an acoustic optical element is relatively small and the optical path of the optical system needs to be adjusted to be long in order to obtain a required scanning length on a surface of a sample.

Also, since an acoustic optical element has wavelength dependence, it is necessary to prepare an acoustic optical element having a different adjustment condition for each color beam in the case of being applied to a color laser microscope. Consequently, the manufacturing cost becomes higher.

In addition, in a case where beam scanning is performed by using an acoustic optical element, it is necessary to precisely control the incident angle of the laser beam with respect to the acoustic optical element. Consequently, the adjustment of the optical system becomes complicated, and the design of the optical system of the whole microscope becomes complicated.

As a method for solving the above-mentioned problems, there is known a method in which a laser beam emitted from a laser source is converted into a rectilinear beam expanded in a single direction with a cylindrical lens, and a surface of a sample is scanned with the rectilinear beam. However, since a laser beam has high coherence, glare easily occurs and a speckle pattern is generated in the rectilinear light beam, which causes the quality of the image to be deteriorated. In this instance, it is assumed that a mercury lamp can be used as a light source. However, since a mercury lamp is large, the microscope apparatus is forced to be large.

An object of the present invention is to achieve a laser microscope in which a surface of a sample can be scanned two-dimensionally without using an expensive acoustic optical element.

Another object of the present invention is to achieve a laser microscope in which the design and adjustment of the optical system is simple, and the structure is small-scale.

Another object of the present invention is to achieve a color laser microscope in which a color image of a sample can be taken without using an acoustic optical element.

SUMMARY OF THE INVENTION

According to the present invention, there is provided a laser microscope including a laser source which generates a laser beam, a rectilinear light beam generating device comprising a micromirror device having a light entrance surface and a plurality of micromirror elements arranged on the light entrance surface in a two-dimensional matrix shape to convert a coherent laser beam emitted from the laser source into an incoherent rectilinear light beam diverging in a first direction by oscillation of a mirror surface of each said micromirror element, a driving circuit for the micromirror device which supplies a driving signal repeatedly and equally to each said micromirror element, a beam deflecting device which periodically deflects the rectilinear light beam in a second direction perpendicular to the first direction, an objective lens which focuses and projects the rectilinear light beam emitted from the beam deflecting device on a sample, a linear image sensor having a plurality of light receiving elements arranged in a direction corresponding to the first direction so as to receive light which is reflected on the sample and passes through the beam deflecting device, and a signal processing circuit which sequentially reads out electric charge stored in each light receiving element of the linear image sensor and outputs a video signal, wherein the laser beam is perpendicularly incident upon the light entrance surface of the micromirror device.

In the present invention, a laser beam emitted from a laser source is converted into an incoherent rectilinear light beam diverging in a first direction corresponding to the main-scanning direction by the rectilinear light beam generating device. The rectilinear light beam is deflected in a second direction (corresponding to the sub-scanning direction) perpendicular to the first direction by the beam deflecting device such as an oscillating mirror or a galvanomirror, or a polygon mirror. The rectilinear light beam is focused by the objective lens and projected on a sample. Consequently, a surface of the sample is one-dimensionally scanned by a focused rectilinear or linear light beam, and the light reflected from the sample is received by the linear image sensor via the beam deflecting device, so that a two-dimensional image of the sample can be taken. Since the surface of the sample is scanned by the rectilinear light beam focused in the sub-scanning direction, a confocal optical system is formed by receiving the rectilinear light reflected from the surface of the sample with the linear image sensor, so that a high-resolution image of the sample can be obtained.

In the present invention, a micromirror device (digital mirror device: DMD) is employed as a rectilinear light beam generating device. Each micromirror element of the micromirror device is used for an image display which forms each pixel of the image. Also, according to the experiments and the analysis the present inventors conducted with respect to the micromirror device, it is confirmed that the micromirror device has high usability as a rectilinear light beam generating device by driving the micromirror elements unitarily as a whole rather than driving each micromirror element individually. More specifically, each micromirror element of the micromirror device is oscillated within an angle of ±10°. Therefore, if each micromirror element is driven individually based on the signal, switching motion is performed so as to oscillate corresponding to the driving signal, and an image corresponding to the video signal is displayed. On the other hand, if the micromirror elements are driven unitarily and repeatedly at a high speed by supplying a driving pulse equally to almost all the micromirror elements, the mirror surface of each micromirror element can oscillate the laser beam incident thereupon in a single direction at a high speed, so that the micromirror device can emit a light beam as a diverging rectilinear beam. When the diverging rectilinear beam is allowed to pass through a focus lens, it is converted into a parallel rectilinear light beam which is expanded in a single direction.

However, a bright spot pattern spread in an array shape was generated when a laser beam was actually projected on the micromirror device, the micromirror element was driven as a whole, and the light reflected from the micromirror device was imaged. Even if the micromirror element was driven by the driving signal, the bright spot pattern only moved, and it was impossible to form a rectilinear scanning beam having good quality.

Based on the above experimental results, the present inventors conducted further experiments and analysis, and it was demonstrated that when the driving frequency of the micromirror device is further increased, the bright spot pattern gradually disappears and a rectilinear diverging light beam is generated. It was confirmed that this rectilinear light beam has uniform luminance with no speckle patterns, and this was an incoherent light beam having no coherence.

The unique function of this micromirror device is as follows:

Generally, a micromirror device has micromirror elements arranged on the light entrance surface thereof in a two-dimensional matrix shape. The mirror surface of each micromirror element is supported by a supporting post, and the supporting post is fixed to a yoke. The yoke is coupled to a base in a state where a torsion hinge is interposed. Each micromirror element is aligned in a first position by torque of the torsion hinge. When a pulse bias voltage is applied between an electrode provided in the base and the yoke, electrostatic force acts against the torque of the torsion hinge, and the mirror surface of the micromirror element is oscillated so as to reach a second position. When reset, it is returned to the first position. If the frequency of the driving pulse is a frequency used for an image display or less, all the micromirror elements are oscillated synchronously, and thereby a bright spot pattern is generated due to coherence action between the light reflected on the mirror surface of each micromirror element. On the other hand, if the frequency is adjusted to be higher, the frequency reaches a resonant frequency of each micromirror element, and it is assumed that each micromirror element is operated individually at each resonant frequency. Since there is a slight difference in the resonant frequency between each micromirror element, even if a driving pulse is applied to each micromirror element at the same time, it is assumed that the oscillation starting position of each micromirror element is different from each other, and each micromirror element performs random oscillation with respect to the driving pulse. Also, the oscillation speed and the return speed are different. This random oscillation will cause phase displacement between the light reflected on the mirror surface, and stop the coherence from being kept, so that an incoherent light beam is emitted from the micromirror device. Incidentally, the present inventors confirmed that an incoherent diverging light beam is generated in a case of driving the micromirror device at a high speed by their experiments. Also, the actual experimental results show that a clear two-dimensional image of a sample can be obtained by the light beam emitted from the micromirror device. In addition, according to the experiments on various kinds of commercially-available micromirror devices, an incoherent diverging light beam can be generated in all of the above-mentioned micromirror devices, and a clear two-dimensional image can be obtained. Consequently, the present invention can be applied to all micromirror devices in which the incident light beam can be oscillated at a high speed by oscillation of the mirror surface of the micromirror element within a certain range of angle.

By using a micromirror device as the rectilinear light beam generating device, firstly, there is an advantage that a single micromirror device is sufficient for three laser beams of red, green and blue of a color laser microscope because it has no wavelength dependence. As a second advantage, since an expensive acoustic optical element is not used, and there is no limitation on the incident angle with respect to the micromirror device, the design of the optical path can be greatly simplified. As a third advantage, since a rectilinear light beam expanded in the main-scanning direction can be generated with a relatively short optical length, the optical length of the whole optical system can be reduced, and thereby a smaller laser microscope can be achieved.

In a preferred embodiment of the laser microscope according to the present invention, a first beam splitter is provided between the laser source and the rectilinear light beam generating device, a laser beam emitted from the laser source is made perpendicularly incident upon the light entrance surface of the micromirror device via the first beam splitter, and the laser beam emitted from the laser source toward the rectilinear light beam generating device and the rectilinear light beam emitted from the rectilinear light beam generating device is separated by the beam splitter. By employing the optical system in which a laser beam emitted from the laser source is made perpendicularly incident upon the light entrance surface of the rectilinear light beam generating device, the design of the optical path can be simplified, and the spatial use efficiency can be improved.

In a preferred embodiment of the laser microscope according to the present invention, a laser source, a micromirror device, a beam deflecting device, an objective lens, and a linear image sensor are arranged in the same plane. By arranging each optical element in the same plane, the spatial use efficiency can be further improved, the size of the laser microscope can be smaller, and various kinds of adjustment can be greatly facilitated.

According to the present invention, there is provided a color laser microscope including a first laser source which generates a red laser beam, a second laser source which generates a green laser beam, a third laser source which generates a blue laser beam, a beam combining system which combines the laser beams emitted from the first, second, and third laser sources into a combined laser beam, a rectilinear light beam generating device comprising a micromirror device having a light entrance surface and a plurality of micromirror elements arranged on the light entrance surface in a two-dimensional matrix shape to convert the combined laser beam into an incoherent rectilinear light beam diverging in a first direction by oscillation of a mirror surface of each said micromirror element, a beam deflecting device which periodically deflects the rectilinear light beam in a second direction perpendicular to the first direction, an objective lens which focuses and projects the rectilinear light beam emitted from the beam deflecting device on a sample, a photoelectric converting device which receives the light reflected on the sample and passing through the beam deflecting device so as to output red, green and blue video signals, and a signal processing circuit which mixes the red, green and blue video signals so as to output a color video signal, wherein the laser beam is perpendicularly incident upon the light entrance surface of the micromirror device.

As mentioned above, since the micromirror device has no wavelength dependence as its primary feature, a single rectilinear light beam generating device is sufficient with respect to the light of three colors of red, green and blue. A conventional color laser microscope has a structure in which light of each color is deflected to the main-scanning direction by using an acoustic optical element. Since the acoustic optical element has wavelength dependence, it is necessary to provide an acoustic optical element with respect to light of each color of red, green and blue. Consequently, the manufacturing cost of the color laser microscope is high, and also various kinds of complicated adjustment of the optical path are required. In contrast, since the micromirror device has no wavelength dependence, a single micromirror device is sufficient with respect to the light of red, green and blue. Therefore, the manufacturing cost can be reduced, the spatial use efficiency can be improved, and the adjustment of the optical system can be greatly simplified.

Various kinds of linear image sensors can be used as the photoelectric converting device for receiving light reflected on a sample. For example, it is possible to decompose a beam reflected on a sample and emitted from an oscillating mirror into light of red, green and blue by a color decomposing optical system, and the light of these colors is received by the linear image sensors respectively so as to generate red, green and blue video signals. It is also possible to generate red, green and blue video signals by using a single linear image sensor in which light receiving elements for selectively receiving light of red, green and blue colors are sequentially arranged in a line state. It is also possible to use a linear image sensor having three lines of light receiving elements for receiving light of red, green and blue colors which are arranged separately with respect to the second direction.

According to the present invention, there is provided a color laser microscope including a first laser source which generates a red laser beam, a second laser source which generates a green laser beam, a third laser source which generates a blue laser beam, a beam combining system which combines the laser beams emitted from the first, second, and third laser sources into a combined laser beam, a rectilinear light beam generating device comprising a micromirror device having a light entrance surface and a plurality of micromirror elements arranged on the light entrance surface in a two-dimensional matrix shape to convert the combined laser beam into an incoherent rectilinear light beam diverging in a first direction by oscillation of a mirror surface of each said micromirror element, a beam deflecting device which periodically deflects the rectilinear light beam in a second direction perpendicular to the first direction, an objective lens which focuses and projects the rectilinear light beam emitted from the beam deflecting device on a sample, a linear image sensor having a plurality of light receiving elements arranged in a direction corresponding to the first direction, a linear image sensor driving circuit which reads out electric charge stored in each light receiving element of the linear image sensor repeatedly in a predetermined cycle, and a signal processing circuit which mixes video signals read out from the linear image sensor to output a color video signal, wherein the first, second, and third laser sources are allowed to emit light sequentially in a predetermined cycle, the linear image sensor driving circuit reads out electric charge stored in the linear image sensor sequentially and synchronously with the light emission of the first, second, and third laser sources so as to output video signals of red, green and blue, and the signal processing circuit mixes the video signals of red, green and blue read out from the linear image sensor so as to output a color video signal.

In this embodiment, the laser source of red, green and blue are driven by a time-division system, a single linear image sensor is used, and electric charge stored in each light receiving element of the linear image sensor is read out synchronously with the light emission of the red, green and blue laser source so as to generate red, green and blue video signals. By employing such a time-division system, it is possible to achieve a color laser microscope in which a single rectilinear light beam is generated and a single linear image sensor is used.

According to the present invention, there is provided a color laser microscope including a laser source which generates a white laser beam, a rectilinear light beam generating device comprising a micromirror device having a light entrance surface and a plurality of micromirror elements arranged on the light entrance surface in a two-dimensional matrix shape to convert the white laser beam into an incoherent rectilinear light beam diverging in a first direction by oscillation of a mirror surface of each said micromirror element, a beam deflecting device which periodically deflects the rectilinear light beam to a second direction perpendicular to the first direction, an objective lens which focuses and projects the rectilinear light beam emitted from the beam deflecting device on a sample, a photoelectric converting device which receives the light reflected on the sample and passing through the beam deflecting device so as to output red, green and blue video signals, and a signal processing circuit which mixes the red, green and blue video signals so as to output a color video signal, wherein the white laser beam is perpendicularly incident upon the light entrance surface of the micromirror device.

The color laser microscope of this embodiment uses a semiconductor laser which generates white laser light as the laser source. In the photoelectric converting device, light reflected on a sample is decomposed into light of red, green and blue colors by a color decomposing optical system, and the light of these colors is received by the linear image sensors respectively so as to generate red, green and blue video signals. By using such a semiconductor laser which generates white laser light, it is possible to achieve an advantage that a single laser is sufficient as the laser source. It is also possible to generate red, green and blue beam signals by using a linear image sensor having a plurality of light receiving elements for selectively receiving light of red, green and blue colors arranged along the first direction as the photoelectric converting device. In this case, it is possible achieve an advantage that a single laser source and a single linear image sensor are sufficient.

DETAILED DESCRIPTION OF PREFERRED EMBODIMENTS

Figure 1:
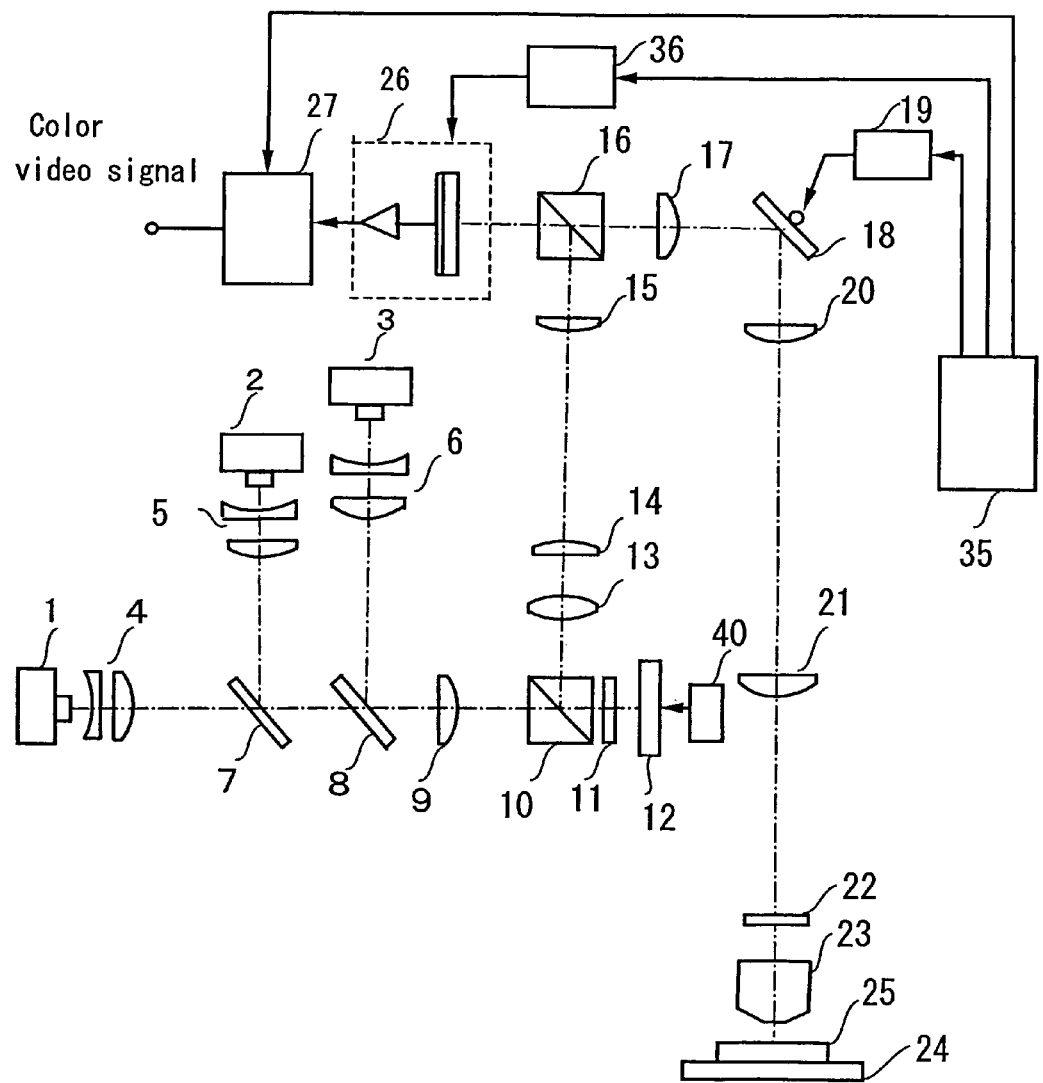
FIG. 1 is a diagram showing an embodiment of a color laser microscope according to the present invention.

FIG. 1 is a diagram showing a basic structure of a color laser microscope provided with a rectilinear light beam generating device according to the present invention. Incidentally, the laser microscope shown in FIG. 1 can be used as a laser microscope for taking a monochrome image. In this embodiment, all optical elements are arranged in the same plane, so as to avoid complicated adjustment of the optical system. As a light source of red, green and blue, a laser source 1 is used for generating a red laser beam, a laser source 2 is used for generating a green laser beam, and a laser source 3 is used for generating a blue laser beam. These three laser sources are formed by a semiconductor laser, and the optical axis of each emitted laser light is adjusted to be in the same plane. Incidentally, each wavelength of the red laser light, the green laser light, and the blue laser light is, for example, 660 nm, 530 nm, and 440 nm, respectively. Expander systems 4 to 6 are provided in front of the laser sources 1 to 3, respectively, for conversion into an expanded parallel beam. The red laser beam emitted from the first laser source 1 is converted into an expanded parallel beam by the expander system 4, transmitted through a first dichroic mirror 7 for transmitting red light and reflecting green light and a second dichroic mirror 8 for transmitting red and green light and reflecting blue light, and enters a first polarizing beam splitter 10 via a first cylindrical lens 9. The green laser beam emitted from the second laser source 2 is converted into an expanded parallel beam by the expander system 5, reflected on the first dichroic mirror 7 and transmitted through the second dichroic mirror 8, and enters the first polarizing beam splitter 10 via the first cylindrical lens 9. The blue laser beam emitted from the third laser source 3 passes through the expander system 6, reflected on the second dichroic mirror 8, and enters the first polarizing beam splitter 10 via the first cylindrical lens 9. Consequently, the first and second dichroic mirrors 7 and 8 form a beam combining system for combining red, green and blue color beams. The first cylindrical lens 9 has functions of focusing the incident light beam in a second direction only (a direction perpendicular to a beam diverging direction of a rectilinear light beam generating device 12 mentioned below, that is, a direction perpendicular to the drawing paper).

The red, green and blue laser beams are transmitted through the first polarizing beam splitter 10, and perpendicularly incident upon the light entrance surface of the rectilinear light beam generating device 12 in a state of being focused via a quarter-wave plate 11. The rectilinear light beam generating device is a micromirror device comprising a plurality of micromirror elements having a rectangular reflecting surface of 14 μm×14 μm made of aluminum which are arranged on the light entrance surface in a two-dimensional matrix shape, for example. A driving pulse is supplied equally and repeatedly to almost all the micromirror elements from a micromirror driving circuit 40. The micromirror driving circuit 40 functions differently from a light valve device. Specifically, the micromirror driving circuit 40 does not supply a driving signal to the micromirror elements selectively corresponding to the video signal, but supplies a driving pulse equally and repeatedly to almost all the micromirror elements. Each micromirror element is rotated or swung at a high speed by the driving pulse which is supplied repeatedly. Consequently, each micromirror oscillates at a high speed, and the incident laser beam is converted into a reflecting beam which oscillates in the first direction by high-speed oscillation of each micromirror element. In this instance, since there is generated a slight difference in the rotation or swing between each micromirror element, a beam portion incident upon each micromirror element is reflected in a state where the phase relationship is random. As a result of this, the phase relationship of the light beam emitted from the micromirror device is in a random state as a whole, the coherence is not kept any longer, and it is converted into a diverging incoherent light beam. Therefore, it is possible to prevent glare or the like from being generated, and take a clear image of the sample.

The diverging incoherent light beam emitted from the rectilinear light beam generating device 12 is transmitted through the quarter-wave plate 11, reflected on the deflecting surface of the first polarizing beam splitter 10, incident upon a focusing spherical lens 13, and converted into a parallel light beam expanded in a first direction by the focusing spherical lens 13. The parallel light beam is focused in the second direction by a second cylindrical lens 14, and incident upon a second polarizing beam splitter 16 via an imaging lens 15. As a result of this, there is generated a parallel rectilinear light beam in the imaging position of the second cylindrical lens 14, which is expanded in the first direction and focused in the second direction perpendicular to the first direction.

The rectilinear light beam incident upon the second polarizing beam splitter 16 is incident upon the oscillating mirror 18 via a relay lens 17. The oscillating mirror 18 deflects the incident rectilinear light beam toward the second direction perpendicular to its extending direction at a sub-scanning frequency of a television rate, for example, under the control of a driving circuit 19. The light beam deflected by the oscillating mirror 18 is incident upon an objective lens 23 via relay lenses 20, 21 and a quarter-wave plate 22. The objective lens focuses the incident rectilinear light beam so as to be projected on a sample 25 mounted on an XY stage 24. Accordingly, the sample 25 is scanned by the rectilinear light beam focused in the second direction.

The beam reflected on a surface of the sample 25 is collected by the objective lens 23, and incident upon the oscillating mirror 18 again via the quarter-wave plate 22, and the relay lenses 21 and 20. The reflected beam from the sample is de-scanned by the oscillating mirror 18, and incident upon the second polarizing beam splitter 16 via the relay lens 17. Since the reflected beam from the sample has been transmitted through the quarter-wave plate 22 twice, it is separated from the illuminating beam from the light source transmitted through the second polarizing beam splitter 16 toward the sample and incident upon a photoelectric converting device 26. The photoelectric converting device 26 receives the beam reflected from the sample so as to generate R, G, and B video signals. There are several kinds of methods for generating R, G, and B video signals, but the details will be described hereinafter. The R, G, and B video signals generated by the photoelectric converting device 26 are supplied to a signal processing circuit 27 so as to output a color video signal by combining the R, G, and B video signals.

Figure 2:
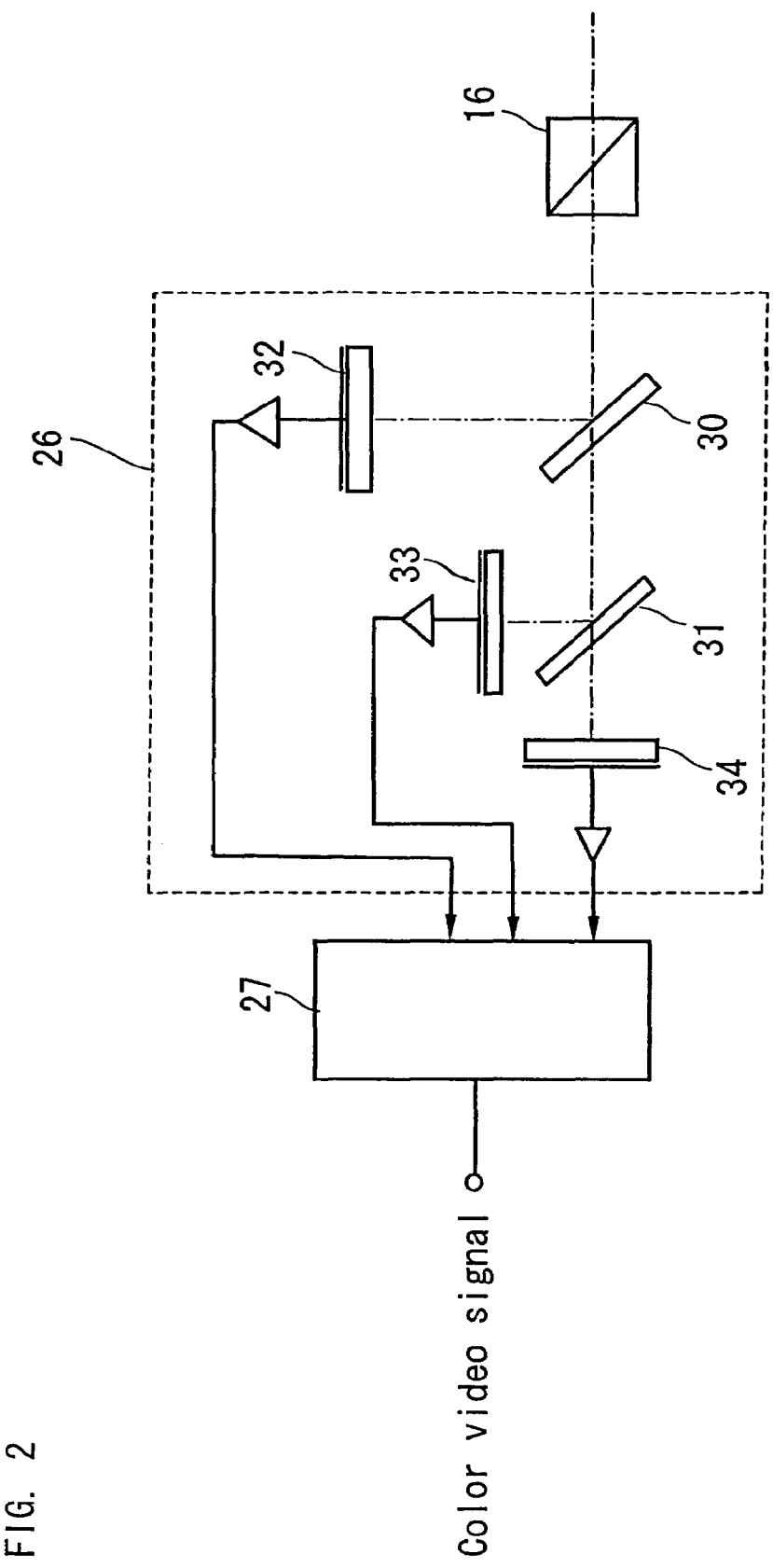
FIG. 2 is a diagram showing a first embodiment of the photoelectric converting device which generates red, green and blue video signals.

An explanation will be made on the photoelectric converting device 26 for generating R, G, and B video signals. A first embodiment of the photoelectric converting device is shown in FIG. 2. In this embodiment, the beam reflected from the sample is decomposed into each color light of red, green and blue by using a color decomposing optical system having dichroic mirrors 30 and 31, and each color light is made incident upon each linear image sensor so as to generate a video signal. Specifically, the beam reflected from the sample is incident upon the first dichroic mirror 30 for transmitting red and green light and reflecting blue light, so that the blue light is incident upon a first linear image sensor 32. Since the incident light has undergone de-scanning by the oscillating mirror 18, it is maintained in a static state on the linear image sensor 32. The red and green light is incident upon the second dichroic mirror 31 for reflecting green light and transmitting red light, so that the green light is incident upon a second linear image sensor 33, and the red light is transmitted through the second dichroic mirror 31 and incident upon a third linear image sensor 34. The first, second, and third linear image sensors have a plurality of light receiving elements arranged in a direction corresponding to the first direction. Electric charge stored in each light receiving element is read out by a read-out signal from a linear image sensor read-out circuit 36 controlled by a controlling signal supplied from a controller 35 at a television rate, for example, so that red, green and blue video signals are generated. The red, green and blue video signals are amplified by an amplifier, supplied to the signal processing circuit 27, and combined in the signal processing circuit so as to output a color video signal. In this way, by scanning a surface of a sample with a rectilinear light beam and making the beam reflected from the sample incident upon a linear image sensor in a state of being focused, a confocal optical system can be formed and a high-resolution image of the sample can be obtained.

Figure 3A:
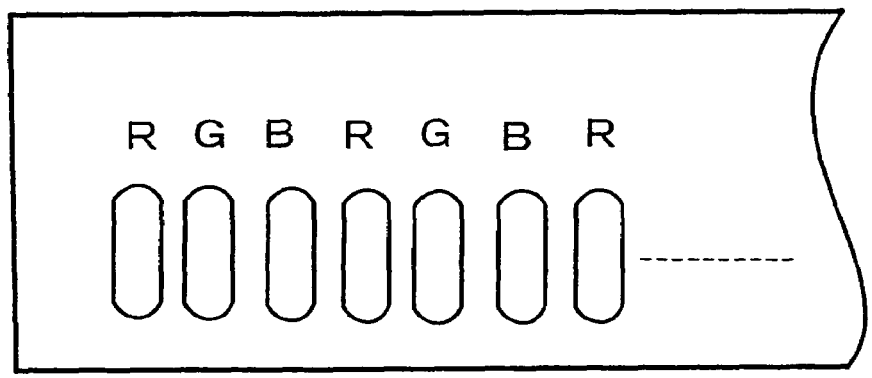
FIGS. 3(A), (B) are diagrams showing second and third embodiments of the photoelectric converting device.

A second embodiment of the photoelectric converting device is shown in FIG. 3(A). In the second embodiment, red, green and blue video signals are generated by using a single linear image sensor. In the linear image sensor shown in FIG. 3(A), light receiving elements for selectively receiving red, green and blue light in which a color filter element for red, green and blue is provided in the front thereof are sequentially arranged in an in-line state in a direction corresponding to the first direction. In the case of such a linear image sensor, it is possible to output red, green and blue video signals by separately outputting electric charge stored in each light receiving element for red, green and blue, and output a color image by combining the red, green and blue video outputs in the signal processing circuit 27.

Figure 3B:
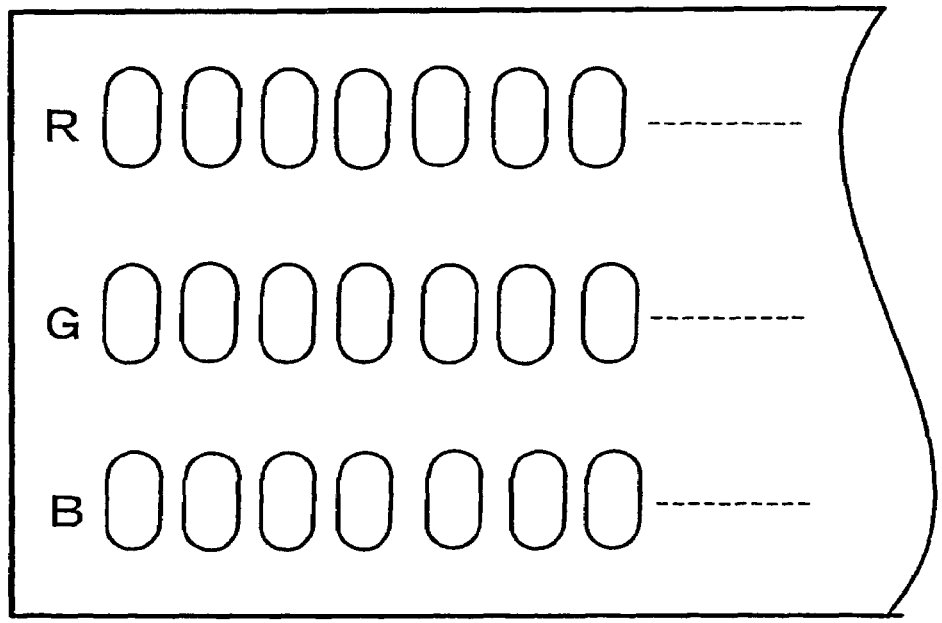
Figure 4A:
FIGS. 4(A)-(D) are waveform diagrams showing an embodiment in which red, green and blue laser sources are driven by a time-division driving system, and red, green and blue video outputs are generated from a single linear image sensor.
Figure 4B:
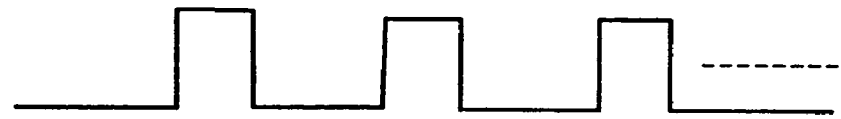
Figure 4C:
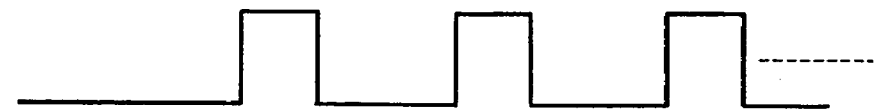
Figure 4D:
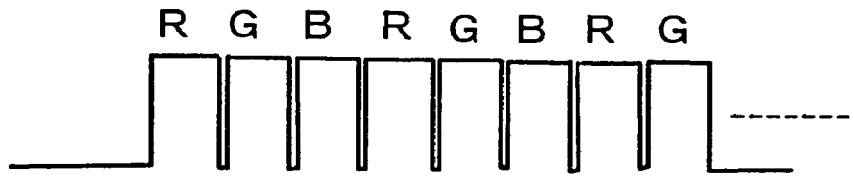

A third embodiment is shown in FIG. 3(B), in which three lines of light receiving elements are arranged in the second direction perpendicular to the first direction which is a direction for arranging light receiving elements of the linear image sensor, so as to make the reflected beam of red, green and blue from the sample incident upon each line of light receiving elements. In this embodiment, the optical axes of the red, green and blue laser sources 1-3 are inclined in the second direction by a slight angle with respect to the basic axis of the microscope, so as to make the red, green and blue illuminating beam incident upon the same position of the sample. In the photoelectric converting device for receiving the reflected beam from the sample, the three lines of light receiving elements are slightly shifted in the second direction. The red, green and blue reflected beams are made incident upon the three lines of light receiving elements, respectively, and red, green and blue video signals output from each line of light receiving elements are combined in a signal processing circuit 29, so that a color image can be obtained. Incidentally, three linear image sensors may be provided in a direction perpendicular to the direction for arranging the light receiving elements, and the red, green and blue beams reflected from the sample are made incident upon the linear image sensors, respectively.

A fourth embodiment will be explained, in which red, green and blue laser sources are driven by a time-division system to take a color image. In this embodiment, the red, green and blue laser sources are sequentially driven by a time-division driving system, and red, green and blue beams sequentially reflected on the sample are sequentially received by a single linear image sensor so as to output red, green and blue video signals. The lighting waveform of the first to third light sources for red, green and blue, and the waveform of video outputs read out from the linear image sensor are shown in FIG. 4. As shown in FIG. 4, only the red light source 1 is lightened under the control of a light source driving circuit (not shown in the drawing), and the other two light sources are stopped from being driven so as to irradiate the sample with a red laser beam only within a predetermined period of lightening. Next, the red light source 1 is stopped, and the light source 2 is driven so as to irradiate the sample with a green illuminating beam only. Within a period of irradiating with the green illuminating beam, electric charge stored in the linear image sensor 26 is read out so as to form a red video output. Next, only the blue light source is driven so as to irradiate the sample with a blue laser beam. Within a period of this lightening, electric charge stored in the linear image sensor is read out so as to form a green video output. In this way, by sequentially outputting luminance information of R, G and B, and combining it in the signal processing circuit 29, it is possible to form a color image. With this time-division system, a single linear image sensor becomes sufficient, and a color decomposing optical system becomes unnecessary.

Another embodiment will be explained, in which a laser source for generating white light is used. Three laser sources for generating each color light of red, green and blue are used in the above-mentioned embodiment. However, it is also possible to use a single laser source for emitting a white laser beam to construct a color laser microscope. In this embodiment, a laser source for generating white laser light is used, and a sample is scanned with a white rectilinear laser beam by using a rectilinear laser beam generating device and a beam deflecting device. The white beam reflected on a surface of the sample is incident upon a photoelectric converting device via the beam deflecting device and a second beam splitter. In the photoelectric converting device, as shown in FIG. 2, the reflected beam from the sample is decomposed into red, green and blue components by a color decomposing optical system, and made incident upon linear image sensors, respectively, so as to generate red, green and blue video outputs. It is also possible to generate red, green and blue video outputs by using such a single linear image sensor shown in FIG. 3 (A) in which light receiving elements for selectively receiving red, green and blue component light are sequentially arranged in the first direction. In this way, by using a laser source for generating white laser light, it is possible to achieve an advantage that a color video signal is formed by a single laser.

Next, a case where the present laser microscope is used as a laser microscope for taking a monochrome image is described. In order to take a monochrome image, for example, only one laser source is driven in a state where the other laser sources are stopped, and electric charge stored in each light receiving element of a single linear image sensor are sequentially read out. It is also possible to take a monochrome image by using a single laser source for generating white light.

Although there have been described what are the present exemplary embodiments of the invention, it will be understood that variations and modifications may be made thereto within the spirit and scope of the appended claims.

What is claimed is:

1. A laser microscope comprising:
    a laser source which generates a laser beam;
    a rectilinear light beam generating device comprising a micromirror device having a light entrance surface and a plurality of micromirror elements arranged on the light entrance surface in a two-dimensional matrix shape to convert a coherent laser beam emitted from the laser source into an incoherent rectilinear light beam diverging in a first direction by oscillation of a mirror surface of each said micromirror element;

a driving circuit for the micromirror device which supplies a driving signal repeatedly and equally to each said micromirror element;

a beam deflecting device which periodically deflects the rectilinear light beam in a second direction perpendicular to the first direction;

an objective lens which focuses and projects the rectilinear light beam emitted from the beam deflecting device on a sample;

a linear image sensor having a plurality of light receiving elements arranged in a direction corresponding to the first direction so as to receive light which is reflected on the sample and passes through the beam deflecting device; and a signal processing circuit which sequentially reads out electric charge stored in each light receiving element of the linear image sensor and outputs a video signal, wherein the laser beam is perpendicularly incident upon the light entrance surface of the micromirror device.

2. The laser microscope according to claim 1 further comprising a micromirror driving circuit which supplies a driving pulse equally and repeatedly to the micromirror elements of the micromirror device, wherein a mirror surface of each micromirror element is oscillated at a high speed corresponding to the driving pulse, and the incident laser beam is converted into an incoherent light beam oscillating in the first direction by high-speed oscillation of each mirror surface.

3. The laser microscope according to claim 2, wherein the rectilinear light beam emitted from the rectilinear light beam generating device has substantially uniform luminance along the first direction.

4. The laser microscope according to claim 1, wherein a first beam splitter is provided between the laser source and the rectilinear light beam generating device, a laser beam emitted from the laser source is made perpendicularly incident upon the light entrance surface of the micromirror device via the first beam splitter, and the laser beam emitted from the laser source toward the rectilinear light beam generating device and the rectilinear light beam emitted from the rectilinear light beam generating device are separated by the beam splitter.

5. The laser microscope according to claim 4, wherein a second beam splitter is provided between the first beam splitter and the beam deflecting device, and the light beam from the light source toward the sample and the reflected beam from the sample toward the linear image sensor are separated by the second beam splitter.

6. The laser microscope according to claim 5, wherein the first and second beam splitters are each a polarizing beam splitter.

7. The laser microscope according to claim 5, wherein a focusing lens element is provided in an optical path between the first beam splitter and the second beam splitter so as to convert the diverging light beam emitted from the rectilinear light beam generating device into a parallel rectilinear beam which is expanded in the first direction.

8. The laser microscope according to claim 1, wherein a cylindrical lens is provided between the laser source and the first beam splitter so as to focus the laser beam emitted from the laser source in the second direction perpendicular to the first direction, so that the laser beam focused in the second direction is made incident upon the light entrance surface of the micromirror device.

9. The laser microscope according to claim 1, wherein the beam deflecting device is an oscillating mirror.

10. The laser microscope according to claim 1, wherein the laser source, the micromirror device, the beam deflecting device, the objective lens, and the linear image sensor are arranged in the same plane.

11. A color laser microscope comprising:

a first laser source which generates a red laser beam;

a second laser source which generates a green laser beam;

a third laser source which generates a blue laser beam;

a beam combining system which combines the laser beams emitted from the first, second, and third laser sources into a combined laser beam;

a rectilinear light beam generating device comprising a micromirror device having a light entrance surface and a plurality of micromirror elements arranged on the light entrance surface in a two-dimensional matrix shape to convert the combined laser beam into an incoherent rectilinear light beam diverging in a first direction by oscillation of a mirror surface of each said micromirror element;

a beam deflecting device which periodically deflects the rectilinear light beam in a second direction perpendicular to the first direction;

an objective lens which focuses and projects the rectilinear light beam emitted from the beam deflecting device on a sample;

a photoelectric converting device which receives light reflected on the sample and passing through the beam deflecting device so as to output red, green and blue video signals; and a signal processing circuit which mixes the red, green and blue video signals so as to output a color video signal, wherein the laser beam is perpendicularly incident upon the light entrance surface of the micromirror device.

12. The color laser microscope according to claim 11, wherein the photoelectric converting device comprises a color decomposing optical system which decomposes light reflected from the sample into color beams of red, green and blue, and three linear image sensors having a plurality of light receiving elements arranged in a direction corresponding to the first direction, respectively, so as to receive the decomposed red, green and blue color beams, and wherein electric charge stored in each light receiving element of the three linear image sensors is sequentially read out so as to generate red, green and blue video signals.

13. The color laser microscope according to claim 11, wherein the photoelectric converting device comprises a linear image sensor having a plurality of light receiving elements for selectively receiving light of red, green and blue colors which are sequentially arranged in a direction corresponding to the first direction, and wherein electric charge stored in the light receiving elements is sequentially read out so as to generate red, green and blue video signals.

14. The color laser microscope according to claim 11, wherein the photoelectric converting device comprises a linear image sensor having three lines of light receiving elements which are arranged separately with respect to the second direction perpendicular to the first direction which is a direction for arranging the light receiving elements, color beams of red, green and blue reflected from the sample and passing through the beam deflecting device are received by the three lines of light receiving elements, respectively, and the optical axes of the first to third laser sources are inclined in the second direction by a slight angle so as to make the light beams reflected from the sample incident upon the corresponding line of light receiving elements, respectively, and wherein electric charge stored in each light receiving element of the three lines of light receiving elements is sequentially read out so as to generate the red, green and blue video signals.

15. A color laser microscope comprising:
a first laser source which generates a red laser beam;
a second laser source which generates a green laser beam;
a third laser source which generates a blue laser beam;
a beam combining system which combines the laser beams emitted from the first, second, and third laser sources into a combined laser beam;
a rectilinear light beam generating device comprising a micromirror device having a light entrance surface and a plurality of micromirror elements arranged on the light entrance surface in a two-dimensional matrix shape to convert the combined laser beam into an incoherent rectilinear light beam diverging in a first direction by oscillation of a mirror surface of each said micromirror element;
a beam deflecting device which periodically deflects the rectilinear light beam in a second direction perpendicular to the first direction;
an objective lens which focuses and projects the rectilinear light beam emitted from the beam deflecting device on a sample;
a linear image sensor having a plurality of light receiving elements arranged in a direction corresponding to the first direction;
a linear image sensor driving circuit which reads out electric charge stored in each said light receiving element of the linear image sensor repeatedly in a predetermined cycle; and
a signal processing circuit which mixes video signals read out from the linear image sensor to output a color video signal,
wherein the first, second, and third laser sources are controlled to emit light sequentially in a predetermined cycle, the linear image sensor driving circuit reads out electric charge stored in the light receiving elements of the linear image sensor sequentially and synchronously with the light emission of the first, second, and third laser sources so as to output video signals of red, green and blue, and the signal processing circuit mixes the video signals of red, green and blue read out from the linear image sensor so as to output a color video signal.

16. The color laser microscope according to claim 11, wherein the first to third laser sources are formed by a semiconductor laser arranged in the same plane, and each color beam emitted from the three semiconductor lasers is made incident upon the rectilinear light beam generating device via a beam combining optical system.

17. The color laser microscope according to claim 16, wherein a beam splitter is provided between the beam combining optical system and the rectilinear light beam generating device, the combined laser beam emitted from the beam combining optical system is made perpendicularly incident upon the light entrance surface of the micromirror device via the beam splitter, and the combined laser beam from the beam combining optical system toward the rectilinear light beam generating device and the combined rectilinear laser beam emitted from the rectilinear light beam generating device are separated by the beam splitter.

18. A color laser microscope comprising:
a laser source which generates a white laser beam;
a rectilinear light beam generating device as comprising a micromirror device having a light entrance surface and a plurality of micromirror elements arranged on the light entrance surface in a two-dimensional matrix shape to convert the white laser beam into an incoherent rectilinear light beam diverging in a first direction by oscillation of a mirror surface of each said micromirror element;
a beam deflecting device which periodically deflects the rectilinear light beam to a second direction perpendicular to the first direction;
an objective lens which focuses and projects the rectilinear light beam emitted from the beam deflecting device on a sample;
a photoelectric converting device which receives light reflected on the sample and passing through the beam deflecting device so as to output red, green and blue video signals; and
a signal processing circuit which mixes the red, green and blue video signals so as to output a color video signal,
wherein the white laser beam is perpendicularly incident upon the light entrance surface of the micromirror device.

19. The color laser microscope according to claim 18, wherein the photoelectric converting device comprises a color decomposing optical system which decomposes light reflected from the sample into color beams of red, green and blue, and three linear image sensors having a plurality of light receiving elements arranged in a direction corresponding to the first direction, respectively, so as to receive the decomposed red, green and blue color beams, and
wherein electric charge stored in each light receiving element of the three linear image sensors is sequentially read out so as to generate red, green and blue video signals.

20. The color laser microscope according to claim 18, wherein the photoelectric converting device comprises a linear image sensor having a plurality of light receiving elements for selectively receiving light of red, green and blue colors which are sequentially arranged in a direction corresponding to the first direction, and
wherein electric charge stored in the light receiving elements is sequentially read out so as to generate red, green and blue video signals.

* * * * *

UNITED STATES PATENT AND TRADEMARK OFFICE
CERTIFICATE OF CORRECTION

PATENT NO. : 7,561,328 B2 Page 1 of 1
APPLICATION NO. : 11/231368
DATED : July 14, 2009
INVENTOR(S) : Awamura et al.

It is certified that error appears in the above-identified patent and that said Letters Patent is hereby corrected as shown below:

<u>Column 4</u>:
       Line 42, change "By arran-" to --By arrang- --.

<u>Column 6</u>:
       Line 5, change "the laser source" to --the laser sources--.
       Line 50, change "it is possible achieve" to --it is possible to achieve--.

<u>Column 10</u>:
       Line 52, change "are sequentially read" to --is sequentially read--.

<u>Column 13</u>:
       There should not be a sub-paragraph break between line 10 and line 11.

<u>Column 14</u>:
       Line 11, change "device as comprising a" to --device comprising a--.

Signed and Sealed this

Twenty-fourth Day of November, 2009

David J. Kappos
*Director of the United States Patent and Trademark Office*